United States Patent [19]

Mosdal

[11] Patent Number: 4,850,441
[45] Date of Patent: Jul. 25, 1989

[54] LIVESTOCK WEIGHING APPARATUS

[76] Inventor: Thelmer Mosdal, 15411 Mosdal Rd., Broadview, Mont. 59015

[21] Appl. No.: 1,322

[22] Filed: Jan. 7, 1987

[51] Int. Cl.⁴ .................. G01G 19/08; G01G 19/14
[52] U.S. Cl. ............................... 177/136; 177/147
[58] Field of Search ....................... 177/132, 136, 147

[56] References Cited

U.S. PATENT DOCUMENTS

| | | | |
|---|---|---|---|
| 1,703,244 | 2/1929 | Mitchell | 177/132 |
| 2,756,984 | 7/1956 | White | 177/147 X |
| 4,286,679 | 9/1981 | Schneider | 177/132 |
| 4,427,083 | 1/1984 | Muddle | 177/132 |
| 4,470,471 | 9/1984 | Mills | 177/132 |
| 4,533,008 | 8/1985 | Ostermann | 177/132 |

FOREIGN PATENT DOCUMENTS

| | | | |
|---|---|---|---|
| 0046079 | 3/1974 | Australia | 177/132 |
| 0041127 | 12/1981 | European Pat. Off. | 177/132 |

Primary Examiner—George H. Miller, Jr.
Attorney, Agent, or Firm—Richard C. Conover

[57] ABSTRACT

A livestock weighing apparatus including a weighing cage suspended inside an outer support structure. A cantilevered weight transfer tube is mounted to the outer support structure and this weight transfer tube has two arms, one at each end thereof, from which the weighing cage is suspended. An electronic weighing scale is attached to one of the arms attached to the weight transfer tube. The weight of the animal on the platform is concentrated at the point at which the scale is attached to the weight transfer tube.

5 Claims, 6 Drawing Sheets

LIVESTOCK WEIGHING APPARATUS

BACKGROUND OF THE INVENTION

The present invention relates to a device for weighing live animals such as hogs or cows.

With livestock weighing scales it is desirable that the scale be capable of weighing live animals which may move about within the cage resting on the weighing platform and further that the actual measuring scale be located above the weighing platform so that the scale will not be affected by possible damage to the scale caused by the animal on the weighing platform. Further it is desirable to have a weighing system which is portable and which can be easily moved to where the animals are rather than moving the animals to where the weighing system is located.

Various devices have been previously designed for weighing livestock. For example, U.S. Pat. No. 4,533,008 to Ostermann discloses a livestock scale where the weight is transferred from a weighing platform to a single point through a fairly complex mechanical connection. The weight of the animal on the weighing platform is indicated on a scale. These devices, however, are fairly complicated in structure and are not as versatile as the present invention.

SUMMARY OF INVENTION

The livestock weighing apparatus according to the present invention is an improvement over the livestock weighing scales now known. The apparatus includes a weighing cage suspended inside an outer support structure. A cantilevered weight transfer tube is mounted to the outer support structure and this weight transfer tube has two arms, one at each end thereof, from which the weighing cage is suspended. An electronic weighing scale is attached to one of the arms attached to the weight transfer tube. The weight of the animal on the platform is concentrated at the point at which the scale is attached to the weight transfer tube. The electronic scale is a digital scale and is designed to indicate an average of the weight of the animal which weight is determined by sampling the weight over a predetermined time period and calculating an average weight from the samples.

With the present invention, animals can be weighed live and the weight of the animal across the weighing platform is averaged at any instant in time and applied at the point where the scale is attached to the weight transfer tube. Meanwhile a restraint is provided for inhibiting the horizontal movement of the cage holding the animal. The weighing apparatus or scale is hung above the cage so that it is well out of the way and is isolated from any possible damage which could be caused by the animals themselves and also from any corrosive effects of the excretions of the animals being weighed.

BRIEF DESCRIPTION OF THE DRAWINGS

In order that the invention may be clearly understood and readily carried into effect, a preferred embodiment of the invention will now be described, by way of example only, with reference to the accompanying drawings wherein.

DESCRIPTION OF A PREFERRED EMBODIMENT

Figure 1:
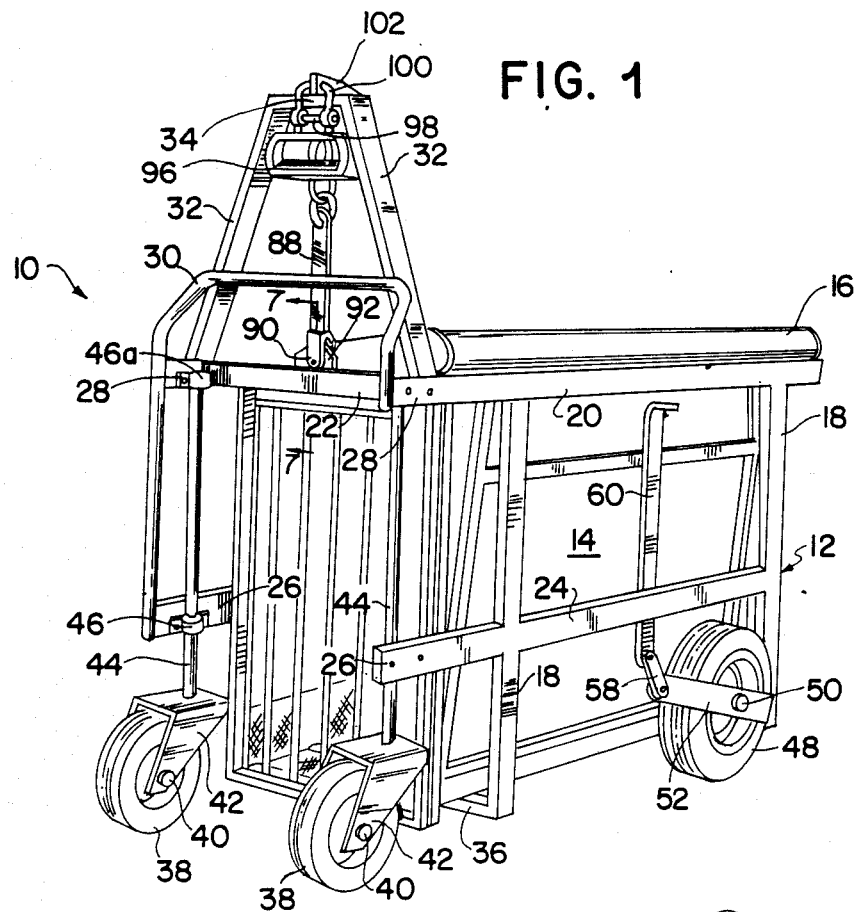
FIG. 1 is a perspective view of the livestock weighing apparatus system according to the present invention.
Figure 3:
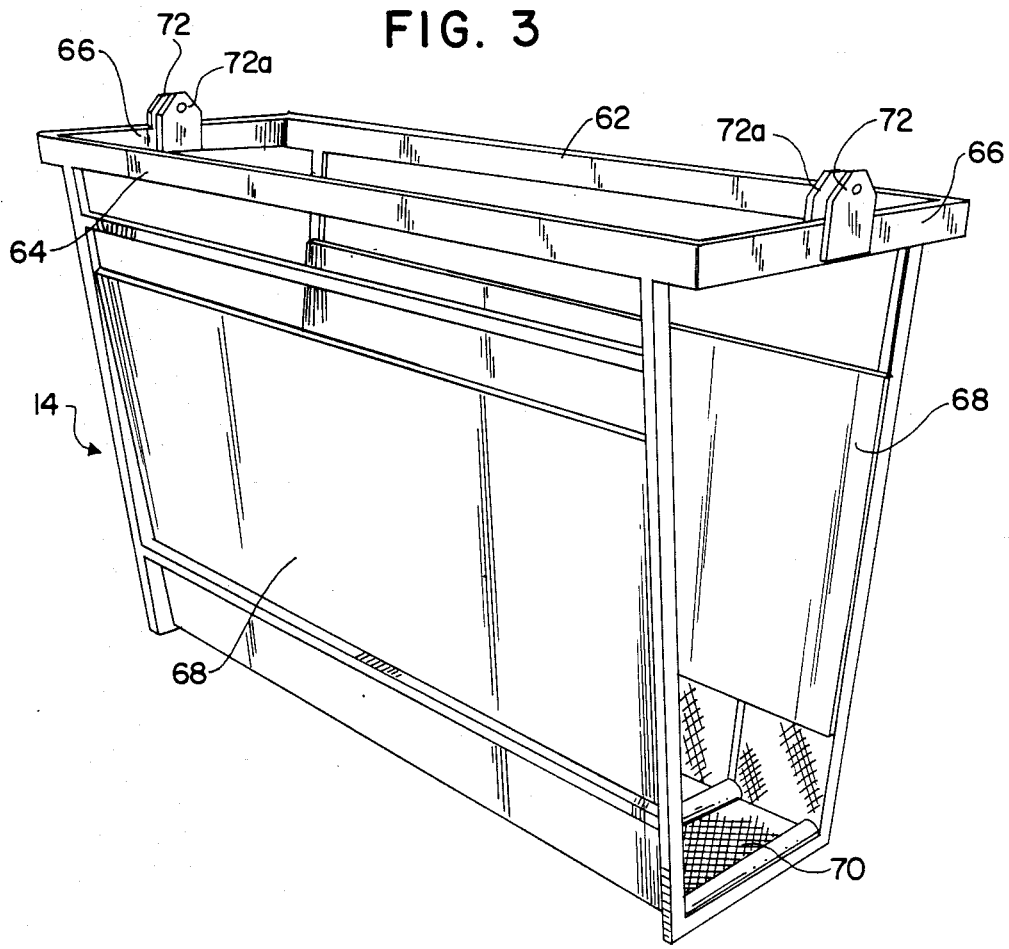
FIG. 3 is a perspective view of the weighing cage alone.
Figure 4:
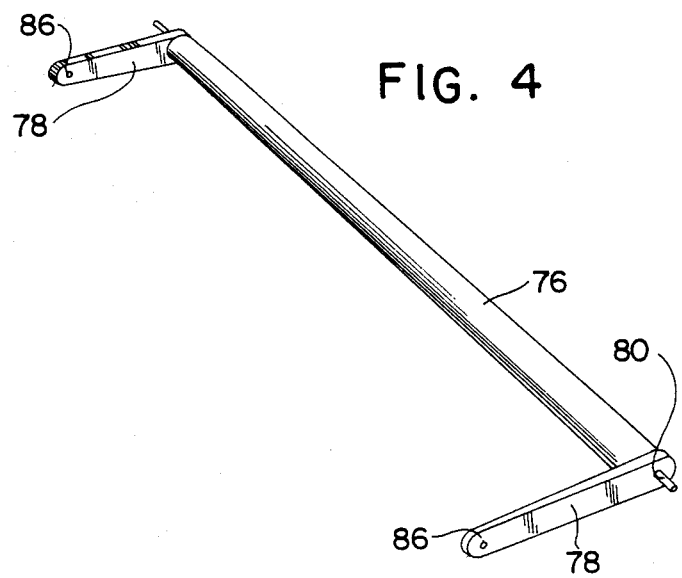
FIG. 4 is a perspective view of the weight transfer tube alone.

The improved livestock weighing apparatus 10 is shown in FIG. 1. This apparatus 10 includes an outer support structure 12 as shown in FIGS. 1 and 2, a weighing cage 14 as shown in FIGS. 1 and 3 and a cantilevered weight transfer tube 16 as shown in FIGS. 1 and 4 which connects the weighing cage 14 to the support structure 12.

Figure 2:
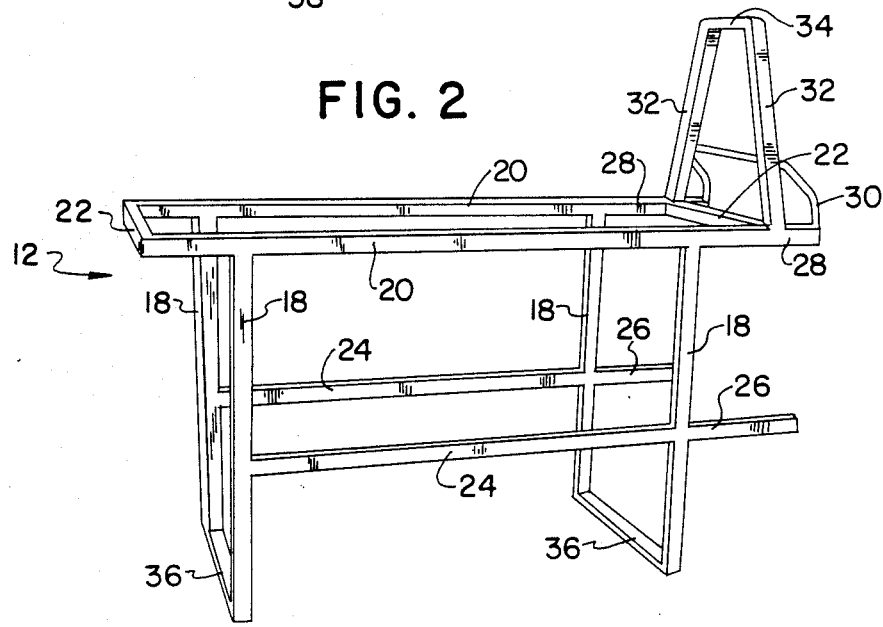
FIG. 2 is a perspective view of the outside support structure alone.

The support structure 12 as shown in FIG. 2 includes four upright legs 18 together with a pair of opposed upper side members 20 joining a pair of legs on each side of the apparatus which members 20 extend beyond the legs 18 at both ends of the support structure 12. The members 20 extending beyoond legs 18 are transversely joined by members 22 at each end thereof. Two opposed lower members 24 which run parallel to members 20 join legs 18 and have a forward extension 26 which extends beyond legs 18. The portions of members 20 which extend beyond legs 18 in the forwardly direction form forward extensions 28 and correspond to the forward extensions 26 of members 24. A handle member 30 is provided which is secured to the forward extensions 28.

Further, there are two upwardly extending members 32 secured to members 20 which are inclined towards each other as shown in FIG. 1. These two upwardly extending members 32 have a top member 34 connecting the two members 32 to form a super structure for supporting the scale as will be subsequently described. A pair of lower cross members 36 join the front and rear legs 18 of the support structure respectively as shown in FIG. 2. All the members of the support structure described above are connected by conventional means such as by welding.

The support structure 12 also has two pairs of wheels for providing mobility to the weighing apparatus 10. Forward wheels 38 as shown in FIG. 1 have axles 40 carried by journals (not shown) positioned in wheel supports 42. The wheel supports 42 are connected to an upwardly extending shaft 44 which is supported by two pillow journals 46 and 46A secured to the lower forward extension 26 and the upper forward extension 28, respectively.

Figure 5:
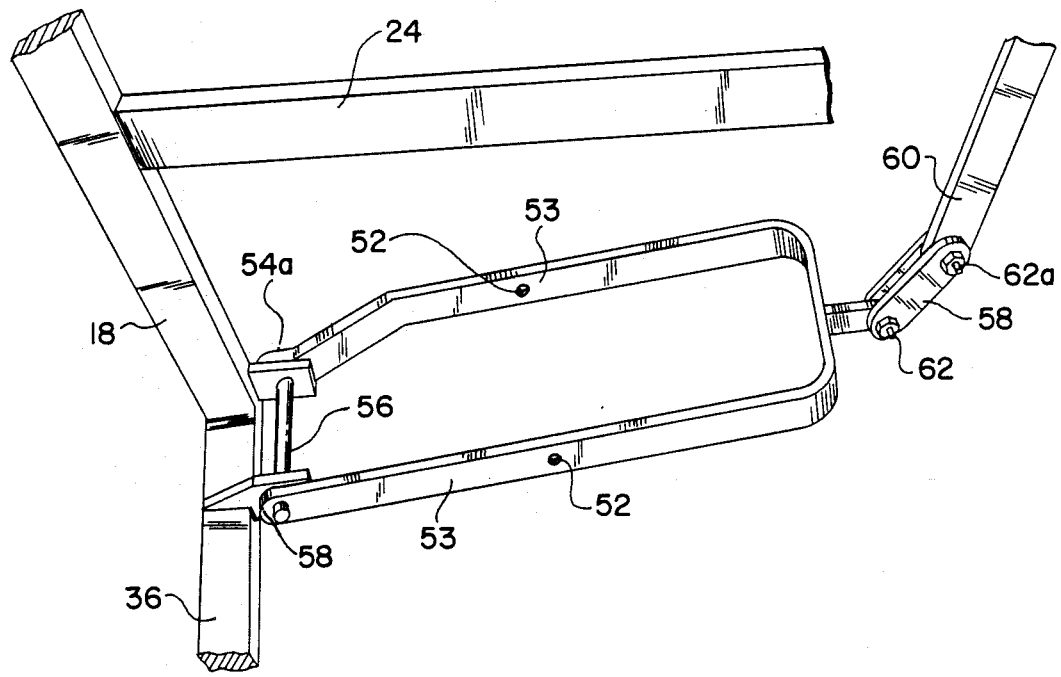
FIG. 5 is a perspective detail view of the apparatus for supporting a rear wheel of the livestock weighing apparatus.

Further, the support structure 12 includes a pair of rear wheel assemblies 48. The wheel assemblies 48 have axles 50 which are supported by a pair of journals 52 formed in rear wheel supports 53 as shown in FIG. 5, which shows the wheel supports with the wheels removed. The rear wheel supports 53 are pivotally attached to a pair of members 54 and 54A attached to the rear lower cross member 36 by an axle 56. The opposite ends of rear wheel support 53 are bent inwardly towards each other. An extension member 57 is secured to rear wheel supports 53 and is pivotally bolted to linking member 58 with a bolt 62. The linking member 58 is further pivotally bolted to a lever handle 60 with bolt 62a. The lever handle 60 is pivotally connected to the respective lower member 24 by means of a bolt 64. With reference to FIG. 1, it can be determined that if the lever handle 60 is drawn in a forwardly direction, the rear wheel 48 is raised and if the handle 60 is moved rearwardly the rear wheel 48 is lowered. The rear wheel 48 is raised so that lower cross member 36 rests on the ground when an animal is being weighed to stabilize the weighing scale when an animal is in the cage.

Figure 12:
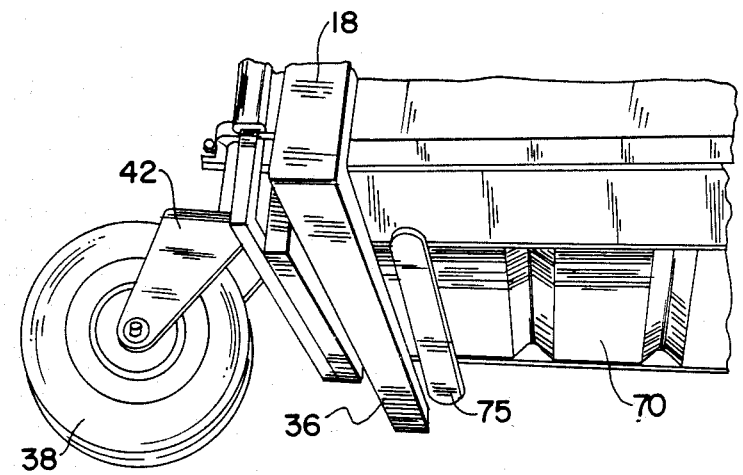
FIG. 12 is an underside perspective view of the front portion of the livestock weighing device of FIG. 1 showing the sway bar used with the present invention.
Figure 13:
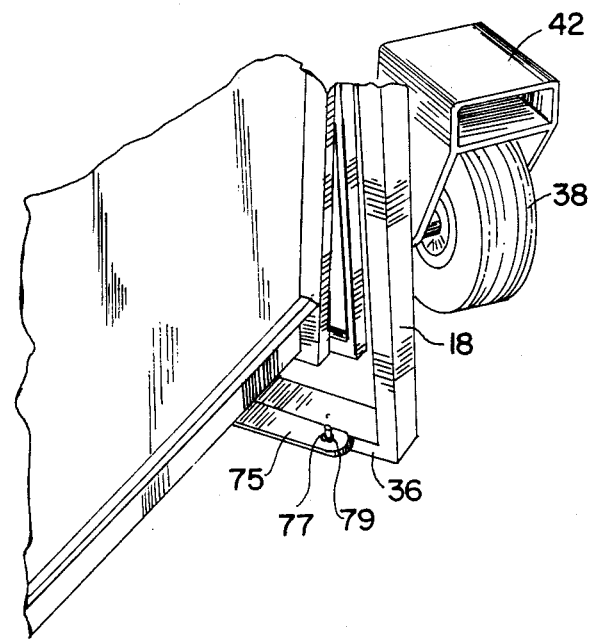
FIG. 13 is a top perspective view of a front portion of the left side of the livestock weighing device of FIG. 1 showing the connection of the sway bar shown in FIG. 12 to the cage supporting frame of the present invention.

The weighing cage 14 is positioned inside the support structure 12 as shown in FIG. 1 and rests on and is supported by the lower cross members 36. To prevent the weighing cage from moving horizontally in a lateral direction during the weighing process, a lateral sway bar 75 as shown in FIGS. 12 and 13 is provided. This sway bar 75 has one end secured to the bottom floor wall 70 as by welding. The other end of sway bar 75 has a bore 79 which is positioned in surrounding relation on a post 77 secured to the forward lower cross member 36 as shown in FIG. 13 such that the sway bar 75 is pivotally and slideably mounted on the post 77. When an animal is to be weighed, the cage 14 is moved upwardly so that it does not rest on lower cross members 36 as will be subsequently described. the post 77 is sized so that it extends in an upward direction a sufficient extent so that sway bar 75 and thus the floor wall 70 will be restrained from lateral movement by post 77 during the weighing process.

The weighing cage 14 is shown in FIG. 3. The weighing cage 14 includes a tope frame having opposing side members 64 and opposing end members 66 which join the two side members 64 to form an upper rectangular frame. Attached to the side members 64 are two side walls 68 which taper inwardly toward the bottom. Joining the two side walls 68 is a bottom floor wall 70. End cage walls 71a and 71b are of the guillotine type and can be provided to retain the live animal in the cage 14. The end members 66 have a pair of upright support members 72 and 72a. Both of these members have a square hole 74 punched therethrough at a 45° angle to the horizontal.

Figure 6:
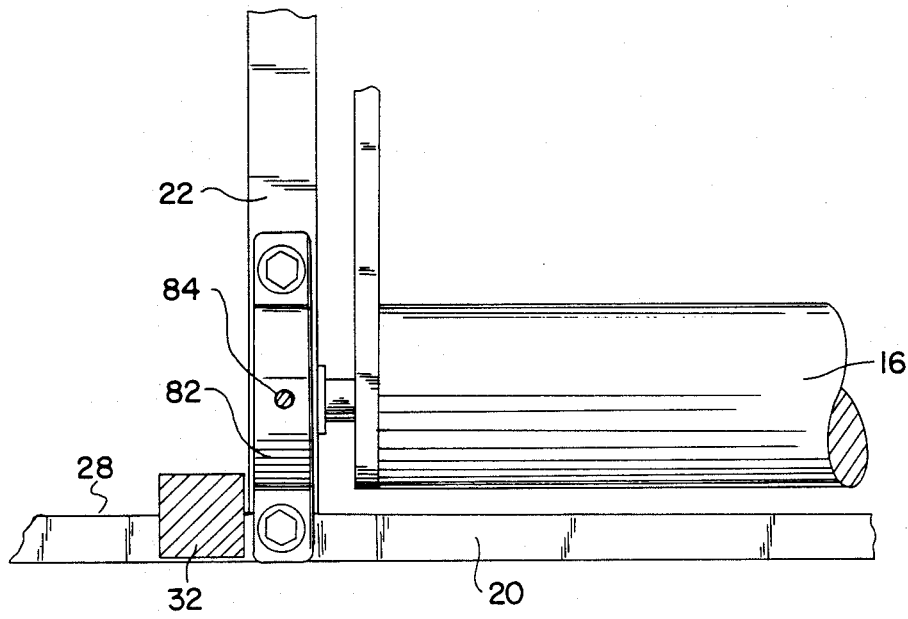
FIG. 6 is a fragmentary top view of the livestock weighing apparatus shown in FIG. 1 with portions broken away which is a detail of the connection of the weight transfer tube to the outer support structure.

The cantilevered weight transfer tube 16 as shown in FIG. 1 and FIG. 4 includes an outer pipe 76 at the ends of which are mounted a pair of transversely extending arms 78 of equal length which are secured to the pipe 76 as by welding. A rod 80 extends through a bore (not shown) in the arm 78 and through the pipe 76 and extends outwardly at each end of the pipe 80 as shown in FIG. 4. The ends of rod 80 are received in a pair of pillow journals 82 as shown in FIG. 6. The pillow journals 82 are secured to the upper cross members 22.

Figure 7:
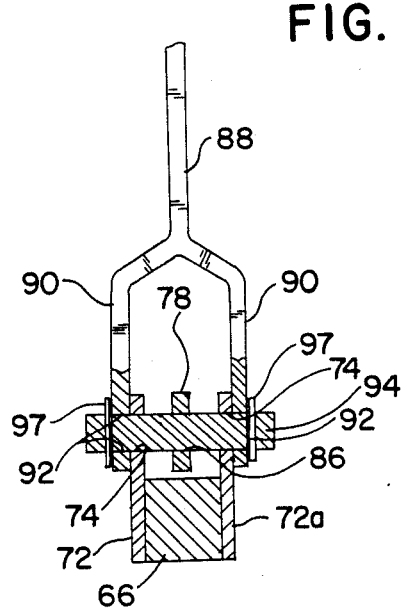
FIG. 7 is a fragmentary cross-sectional view along line 7—7 in FIG. 1 which is a detail of the connection of the weight transfer tube to the weighing cage.

As shown in FIG. 1, the arms 78 attached to the weight transfer tube 16 are positioned to extend towards the center of the cage. The free ends of the arms 78 are positioned between the upright members 72 and 72a attached to the end members 66 of the weighing cage 14 as shown in FIG. 7. The arms 78 have a circular bore 86 which is aligned with the square holes 74 of the upright members 72 and 72a. Further, an upright linking member 88 is provided as shown in FIGS. 1 and 7 having a pair or arms 90. The arms 90 each having a bore 92 formed therein as shown in FIG. 7. An elongate piece of square key stock 94 sized to be smaller in cross-section than square hole 74 is inserted in the bores 92, through the square hole 74 of upright members 72 and 72a and through the circular bore 86 in arm 78 of weight transfer tube 16 as shown in FIG. 7. The key stock member 94 has a pair of transverse bores therein at the ends thereof and cotter pins 97 hold the key stock member 94 in place. In this manner, the weighing cage 14 is secured to the weight transfer tube 16 at the pivot point of the upright members 72 and 72a hanging on the key stock member 94 which acts as a knife-edge support in circular bore 86.

Figure 8:
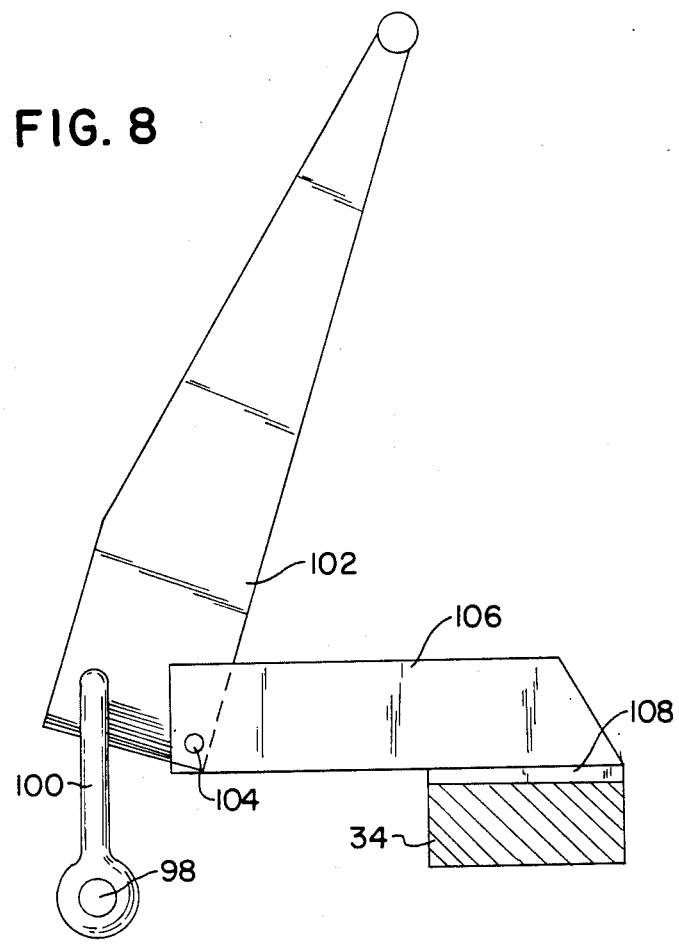
FIG. 8 is an enlarged fragmentary front view of the livestock weighing device of FIG. 1 with portions broken away showing the connection of the weighing scale to the outside support structure with the scale handle in an upward scale release position.
Figure 9:
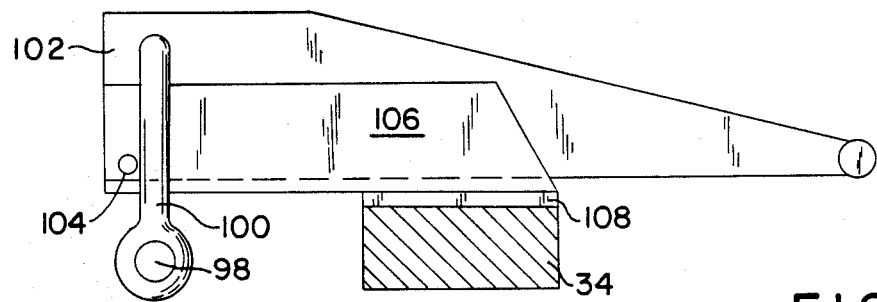
FIG. 9 is a fragmentary view of FIG. 8 with the scale handle in a down position.
Figure 11:
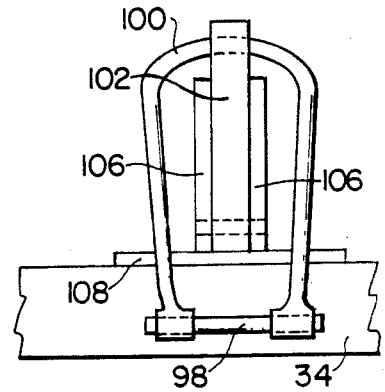
FIG. 11 is a left hand side view of FIG. 9.
Figure 10:
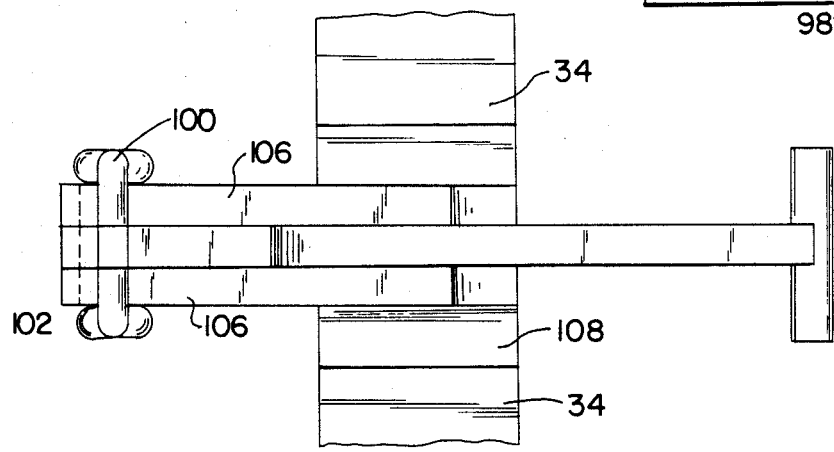
FIG. 10 is a top view of FIG. 8.

The linking member 88 extends upwardly as shown in FIG. 1. An electronic scale 96 has one end attached to the member 88 as shown and has its upper end attached to a pin 98 as shown in FIG. 8. The pin 98 is mounted in two ends of a clevis 100 which is pivotally carried by handle 102 as shown in FIG. 8. The handle 102 is pivotally secured by a pin 104 to a pair of spaced apart and parallel handle support members 106 as shown in FIGS. 9, 10 and 11. The handle support members are secured as by welding to a plate member 108 which in turn is welded to cross member 34 as shown in FIGS. 1 and 8.

The handle 102 and clevis 100 provide an over center latch for holding the scale 96. As the handle 102 is raised upwardly as shown in FIG. 8, the clevis 100 drops and the scale 96 can be mounted on the clevis. Once the scale is mounted on the clevis, the handle is then moved downwardly as shown in FIG. 9 and the scale 96 is moved upwardly. As can be seen by moving the handle 102 downwardly the entire cage 14 is moved upwardly such that cage 14 is suspended from the scale 96 above the lower cross member 36 as shown in FIG. 1. In this position the scale 96, which is attached to the support structure 12, carries the full weight of the cage 14 and anything in it. The weight transfer tube 16 is freely rotatable about the axis of rod 80 which is mounted in pillow journals 82 and is designed to be "stiff" and not subject to torsion caused by the weight of an animal in the cage 14 which is brought to bear on the ends of cantilever arms 78. Thus, as can be seen, the weight transfer tube 16 acts to transfer the entire weight of the cage 14 and anything in it to a single point where the linking member 88 is mounted to cage 14. The electronic scale 96 is calibrated to read zero weight when the cage 14 is empty even though the full weight of the cage is being carried by scale 96.

In a preferred embodiment the electronic scale 96 is a detachable hanging scale. In the event repairs are necessary it can be easily removed, repaired and replaced. Further the electronic scale is preferably a digital scale adapted to permit weight averaging with a push of an operating button positioned on the face of the instrument. When weight averaging is desired the button is depressed. The internal circuitry of the scale samples the shifting load of the live animal on the weighing cage. In a preferred embodiment, this sampling is conducted twenty-four times during a three second interval. The circuitry of the scale calculates an average weight from the samples and displays the average weight thus calculated. This procedure can be repeated a number of times until the user is satisfied that he knows the weight of the animal being weighed.

With the present invention, it is possible to easily weigh live animals such as hogs or cattle. A live animal is simply driven into the cage 14 and a reading is taken with the scale 96. The animal will be moving around in the cage but the electronic scale 96 will provide an accurate indication of the actual weight of the animal.

With the present invention, the weight of the animal which is unequally distributed across the area of the floor of the weighing cage 14 is transferred through the cantilevered arms 78 of the weight transfer tube 16 to the point where the scale is attached to the upright linking member 88. In this very simple mechanism, the weight transfer tube 16 acts to combine and average the weight across the weighing cage and apply that weight to the point where the scale is attached to the weight transfer tube 16. The weight transfer tube 16 actually rotates only a few mils with a load of over 1000 pounds. Therefore, the measurement is very accurate.

The invention provides a very simple way of weighing live animals. It is portable and easily transportable. It does not require taking several separate measurements across the weighing cage and the scale is located above the weighing cage so that the excrement from the animals does not damage the scale. Further the scale can be removed and the cage easily washed down, cleaned and disinfected without causing damage to the hanging scale used with the system.

While the fundamental novel features of the invention have been shown and described, it should be understood that various substitutions, modifications and variations may be made by those skilled in the art without departing from the spirit or scope of the invention. Accordingly, all such modifications or variations are included within the scope of the invention as defined by the following claims.

I claim:

1. An improved scale including:
   (a) a weighing platform for carrying the load to be weighed;
   (b) support means for supporting the weighing platform;
   (c) weighing means attached to the support means and from which the weighing platform is suspended for weighing the load carried by the weighing platform;
   (d) weight transmitting means for transmitting the weight of the load distributed across the platform to the location where the weighing platform is suspended from the weighing means;
   (e) the weight transmitting means including an elongate member constructed to substantially resist relative torsional movement between the ends of the elongate member, the member being mounted at each end thereof to the support means for free rotation about the longitudinal axis of the elongate member, and further including a pair of cantilevers, each having a proximate and a distal end thereof, the proximate end of each cantilever being secured to an end of the member such that the cantilevers are located at opposite ends of the member and each cantilever extends in the same direction normal to the longitudinal axis of the member, the distal ends of each member being pivotally secured to the weighing platform; and
   (f) wherein the weighing platform is suspended from the weighing scale where a distal end of one of the cantilevers is pivotally secured to the weighing platform.

2. The scale according to claim 1 wherein the support means is adapted to permit vertical movement of the weighing platform relative to the support means from a position where the weighing platform rests on a cross member of the support means to a position above the cross member and wherein a latch means is provided for operatively connecting the weighing means to the support means, the latch means being constructed so that when the weighing means is operatively connected to the support means, the weighing platform is lifted vertically relative to the support means to a position above the cross member whereby the weight of the cage and the load are carried by the weighing means alone.

3. The scale according to claim 2 further including restraining means comprising a sway bar connecting the support means and the weighing platform for substantially restraining horizontal movement of the platform while allowing generally unrestricted vertical movement of the platform relative to the support means.

4. The scale according to claim 1 wherein the support means include a pair of front wheel and a pair of rear wheels for moveably supporting the support means on a ground surface, the rear wheels being mounted on axles which axles are pivotally connected to the support means with linking members, the pivotal linking members being adapted to selectively permit the axle to rotate upwardly relative to the support means to permit the rear portion of the support means to be lowered to the ground surface.

5. The scale according to claim 1 wherein a weighing cage is constructed on the weighing platform, which cage includes a rectangular top frame having opposing side members and opposing end members which join the two side members, the top frame being connected to the weighing platform with a pair of side walls extending from the respective side members to the weighing platform, the end members of the top frame each having an upright support member located midway between the ends of each end member, each upright support member having a square hole therein punched therethrough at a 45° angle to the horizontal; and
   wherein each of the cantilevers of the weight transmitting means have a bore therethrough located at the distal ends thereof, the distance between the axis of the bore and the longitudinal axis of the tube, being substantially identical; and
   wherein the weight transmitting means is connected to the weighing platform by a pair of square key stock members, each key stock member being sized to be smaller in crosssection than the square holes in the upright support members attached to the top frame of the weighing cage, each square key stock member extending through a respective bore in a cantilever of the weight transmitting means and a corresponding square hole in the upright member attached to the top frame of the weighing cage; and wherein the weighing means is attached to one end of the weighing cage by a linking member having one end attached to the weighing means and having a second end having a bore therethrough which is sized to receive the square key stock located at the corresponding end of the weighing cage.

* * * * *